Jan. 29, 1957  J. U. WHITE  2,779,230
OPTICAL SYSTEM PROVIDING A LONG OPTICAL PATH
Filed July 20, 1951  2 Sheets-Sheet 1
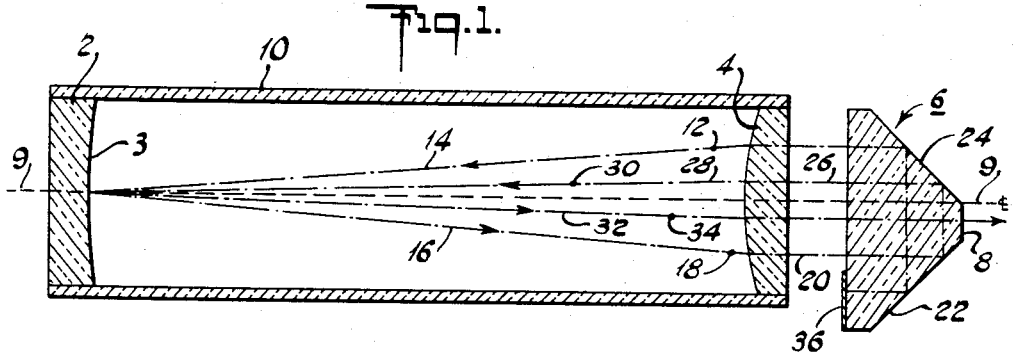
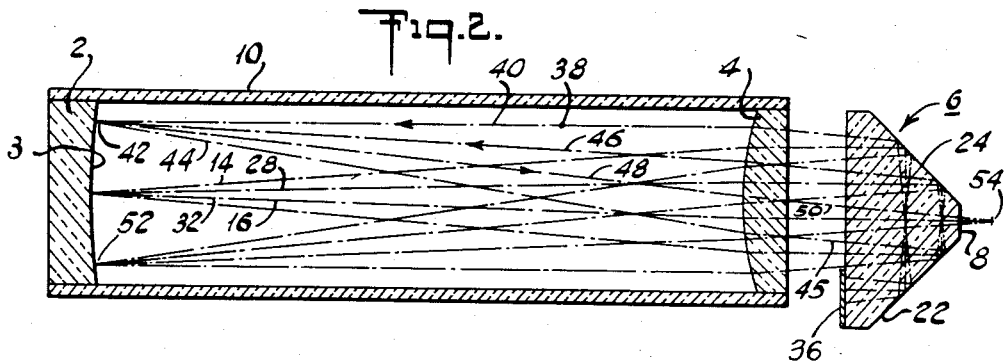
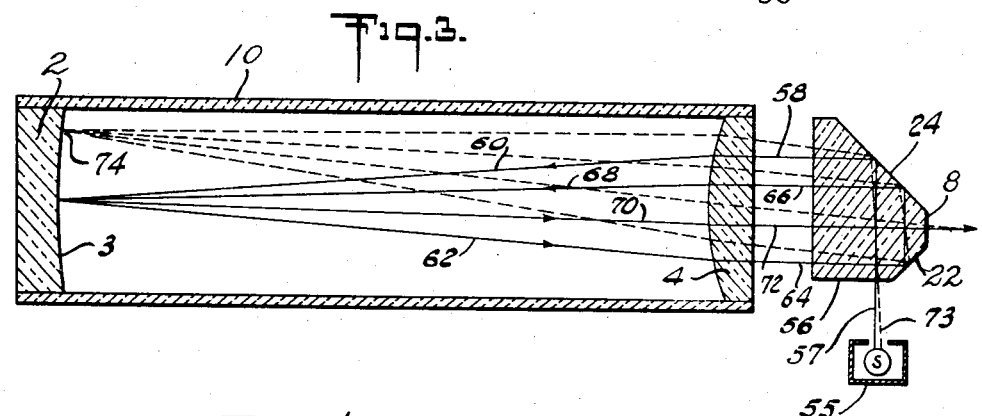
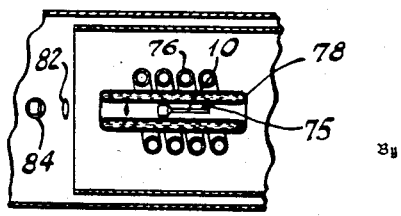
Inventor
JOHN U. WHITE.
By Curtis, Morris & Safford.
Attorneys

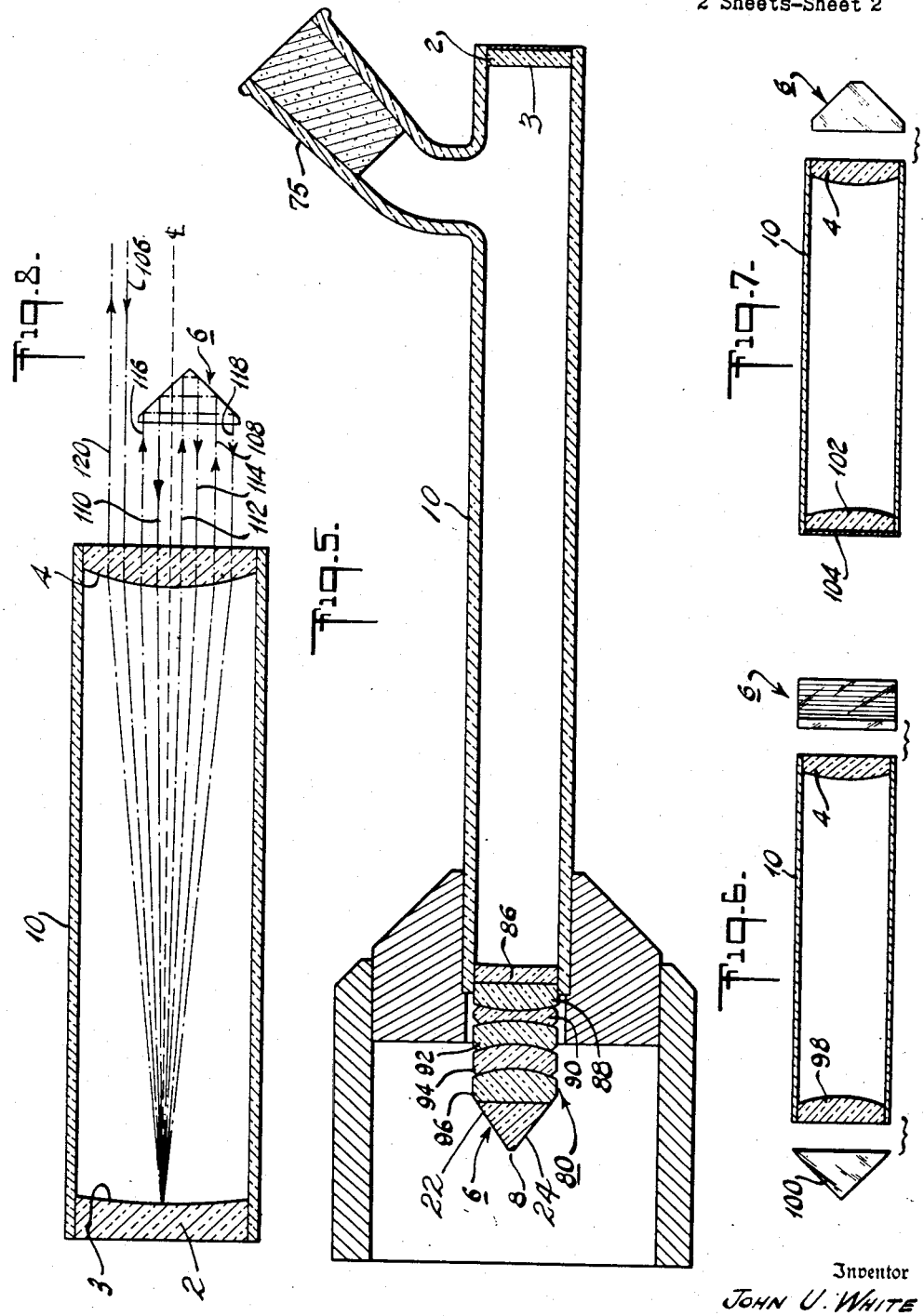

United States Patent Office 2,779,230
Patented Jan. 29, 1957

2,779,230
OPTICAL SYSTEM PROVIDING A LONG OPTICAL PATH

John U. White, Darien, Conn.

Application July 20, 1951, Serial No. 237,773

17 Claims. (Cl. 88—1)

This invention relates to optical systems and in particular to arrangements for producing a long optical path within a limited space.

Such a long optical path is useful in making measurements or studies of absorption, scattering, or other phenomena. For example, such an optical system may be used to advantage in the study of the Raman effect. In a Raman spectrograph, a transparent sample of the material to be examined is illuminated by a beam of monochromatic light and a small portion of this light is scattered and is radiated by the sample in directions transverse to the direction of the original beam. Part of this scattered light will have the same wave length as the incident light, but a smaller portion of the scattered light will have wave lengths substantially different from that of the incident light. This latter portion of the light is produced by a change in the energy level of light striking molecules of the sample. By determining the wave lengths of the scattered light, it is possible to obtain qualitative data relating to the sample, because the difference in wave length between the incident light and the scattered light is a function of the composition of the sample. Moreover, quantitative data can be obtained also by a comparison of the respective intensities of the light. Such measurements are important also in the study of molecular structure of materials.

One problem, however, in constructing a practical Raman spectrograph is that the intensity of the scattered light which is to be measured is very low. Thus, in much of the earlier apparatus it was necessary to utilize photographic methods in which the photographic plate was exposed for several hours.

In accordance with the present invention, an improved optical system is provided whereby a greater proportion of the scattered light can be collected. This is accomplished by arranging a long optical path which passes back and forth through the sample at varying directions a relatively large number of times before finally passing out an exit port. In general, the longer the optical path, the greater will be the proportion of the light that is collected. The wave length and intensity of the scattered light then can be determined rapidly and accurately by a spectrograph or a monochrometer and a light-sensitive detector.

Such a long optical path length can be achieved by using a concave spherical mirror spaced from and facing a totally reflecting prism. The center of curvature of the mirror coincides with the "effective mirror surface" of the prism so that the optical path converges there and diverges in going toward the spherical mirror. The multiple number of traversals is produced by off-setting the prism slightly from the axis of the spherical mirror. An arrangement of this general type is described in an article by Kratz and Mack and appearing in the Journal of the Optical Society of America of August 1942, pages 457 to 464. However, with optical systems of that type, each time (except the first) that the diverging light approaches the spherical mirror, part of it misses the mirror and any energy therein is lost. The greater the number of traversals, the more light is lost. This effect is termed "loss of aperture," and may be compared, simply, with the restricted viewing angle of a person having "tunnel vision." With a large number of traversals, this loss of aperture results in an inefficient light collecting system.

Kratz and Mack, in the article cited above, point out that this loss of aperture can be partially compensated by using a prism having an angle slightly less than 90° so that the prism tends to keep the center of the optical path nearer the center of the mirror. This arrangement, however, provides only a limited compensation and does not eliminate the loss of aperture when there is more than a few traversals.

In the present invention, a lens system is arranged to provide an efficient optical system wherein a large number of traversals of the optical path are produced in a small space with no loss of aperture.

Accordingly, it is among the objects of this invention to provide an improved structure for producing long optical paths of large angular aperture; to increase the efficiency of such optical systems; to minimize the space required for the optical system; to reduce losses in the system caused by refraction at optical interfaces; and to provide an improved highly-efficient illumination and light collecting arrangement for use in Raman spectrographs.

In one embodiment of the invention in which it is incorporated in a Raman spectrograph, a quartz sample tube containing a transparent liquid to be studied is positioned within an helical mercury arc lamp. A filter for excluding the undesired wave lengths of light is provided between the sample tube and the light source. By this means, high intensity substantially monochromatic illumination of the sample is attained. One end of this sample tube is provided with a spherical mirror, and at the other end of the tube is positioned a lens system and a 90° prism. This prism is slightly off-set from the axis of the spherical mirror and truncated to provide an exit for the scattered light. The prism, cooperating with the other optical elements, produces an arrangement by which a large proportion of the scattered light from the liquid sample is reflected back and forth between the prism and the spherical mirror until it finally emerges through the truncated portion of the prism. The light source is so positioned with respect to the sample tube that none of the original light can be refracted or reflected so as to emerge from the truncated portion of the prism unless it is scattered by the transparent sample.

The resulting beam of light from the prism is then passed into an auxiliary optical system which is adjustable to select any desired wave length of light and transmit it to a light-sensitive device. Thus, by scanning the light selecting device over the desired range and observing the indication of the presence and intensity of light at the detector, the wave lengths of the scattered light can be determined.

Other aspects, objects, and advantages of the invention will be in part pointed out in and in part apparent from the following description considered in conjunction with the following drawings, in which:

Figures 1 and 2 are diagrammatic illustrations of one embodiment of the invention to illustrate the principles of operation;

Figure 3 is a diagrammatic representation of another embodiment of the invention;

Figure 4 is a partial sectional view of the optical system represented in the preceding drawings as embodied in a Raman spectograph.

Figure 5 is an enlarged sectional view of the optical system embodied in apparatus of Figure 4; and Figures 6, 7 and 8 are diagrammatic representations of modifications of the optical system shown in the preceding drawings.

As shown in Figure 1, a mirror 2 having a polished spherical surface 3 is positioned facing a converging lens 4, beyond which is positioned a truncated 90° prism, generally indicated at 6. An exit port for the prism 6 is provided by the truncated portion 8 of the prism. The centerline of the prism 6 is off-set slightly from the optical axis or centerline 9 of the lens and mirror system.

In order to permit a simplified explanation of the operation of this system, assume that the lens 4 and mirror 2 are mounted at opposite ends of a sample tube 10 which contains a transparent sample of a liquid material that is illuminated by light arriving from a direction transverse to the longitudinal axis of the sample tube 10.

As described above in connection with the Raman spectrograph, light, which may be of different frequency from the incident light, will be given off by the molecules of the sample in directions transverse to the incident rays.

Assume that light is generated at a point 12 in the sample tube and is directed along the line 14 toward the center of the spherical mirror surface 3. This light will be reflected by the mirror along the path indicated by the line 16.

If, for example, light is produced also at a point 18 on this path and is directed along this path it will be added to the light from point 12 and will pass through the lens 4.

The focal length of the lens 4 is equal to the distance from the mirror 2 to the lens 4 so that light coming from the direction of the center of the mirror surface 3 will be refracted by the lens 4 and caused to travel along a path 20 parallel with the optical axis of the lens 4.

This light is reflected from a surface 22 of the prism 6, travels along a path perpendicular to the axis of the lens 4 and mirror 3, and is reflected by a prism surface 24, which is in a plane 90° from the plane of the surface 22. The light then returns along a path 26, also parallel with the axis 9 of the lens and mirror system, through the lens 4 where it is again refracted and directed along the path 28 toward the center of the mirror surface 3. It will be noted that the path 28 is displaced from the original path 14 because the prism is not centered on the optical axis of the lens 4 and spherical mirror surface 3, the angle between the two paths depending upon the amount by which the prism is off-set.

If light is being generated at a point 30 on the path 28 and is directed toward the center of the mirror surface 3, it will be added to the already-collected light and reflected from the center of the mirror surface 3 along the path 32. If light is also being generated at a point 34 and directed along the path 32, it will be added to the already-collected light and will pass through lens 4 and the prism 6 and will exit through the truncated portion 8 of the prism 6.

Thus, by this consideration of certain light rays, it is seen that any light produced in the sample at any point along the paths 14, 16, 28, or 32 and directed in the proper direction along one of the paths will be collected and eventually transmitted through the flat face 8 of the prism so that it can be focused on the slit of an analyzer or used in any desired manner.

A portion of the face of the prism 6 may be rendered opaque, as at 36, so that light traveling in the opposite direction along the above-mentioned paths will not leave the prism 6, or it may be made reflecting so that light striking this surface will be reflected back and added to the other light.

Light generated at other points within the sample tube 10 will also be collected and passed through the exit port 8. Additional examples of such optical paths are shown in Figure 2 together with the paths already described in connection with Figure 1. Thus, light generated at a point 38 and directed along a path 40 toward a point 42 on the mirror surface 3 is reflected along a path 44, is refracted by the lens 4, follows a path 45, is reflected by the 90° prism surfaces 22 and 24, and returns through the lens 4 along a path 46 to the same point 42 on the mirror surface 3. The path 46 is displaced from the original path 40 by the off-set prism but the light returns to the same point 42 on the mirror surface toward which the path 40 was directed. The light from the path 46 is reflected by the mirror surface 3 and returns along the path 48, which is refracted by the lens 4 so that the light passes along a path 50 through the truncated portion 8 of the prism 6. In a similar manner, light striking a point 52 traverses the sample tube 10 a number of times and finally exits through the truncated portion 8 of the prism 6. Light produced at any point along any of these paths and directed in the proper direction along the path will be collected and eventually exit through the flat face 8 of the prism. It will be noted also that the light passing through the truncated portion 8 of the prism comes to a focus at the point 54, this feature being of particular advantage where the light is to be focused on the slit of an analyzer or in any instance where it is desirable that the light be concentrated into a small area.

As pointed out above, the utility of this lens system is not limited to applications based on the scattering of light, such as in the Raman spectrograph, and it is useful also in the study of light absorption, particularly in connection with materials having very low light absorption. Figure 3 shows an arrangement wherein a beam of light from an external source 55 enters the prism through a flat surface 56. A ray of this beam, indicated by a solid line 57, is reflected by the prism surface 24, successively travels along the paths indicated at 58, 60, 62, 64, 66, 68, 70 and 72 and through the exit port 8. The path of another ray of this beam is indicated by a broken line 73 in which the light is reflected a number of times from a different point 74 on the mirror surface 3 and passes out through the truncated portion 8 of the prism 6. Other rays of this beam will follow similar but displaced paths through the sample and will ultimately exit through the surface 8.

Although in the example shown, the light rays traverse the distance between the lens and the mirror surface a maximum of four times, it is to be understood that the system is not limited to four traversals and that the number of traversals may be increased by decreasing the amount by which the prism 6 is off-set from the optical axis of the system.

It is apparent from what has been said above that the light may exit from the prism 6 through a truncated portion on the side of the prism instead of the truncated portion 8, or that two truncated portions on the prism may be provided so that two exits are available for the light, the selected arrangement depending upon the particular application of the optical system.

Figures 4 and 5 illustrate the invention as embodied in a Raman spectrograph. As shown in Figure 4, the sample tube 10 of quartz or other suitable material is provided with neck 75 having an opening through which the tube can be filled with a transparent liquid whose properties are to be measured. This tube 10 is positioned within the turns of an helical mercury arc lamp 76 so that the liquid within the tube 10 is illuminated throughout the circumference of the tube and over most of the length of the tube. In order to filter out the undesired portions of the spectrum of the light from the mercury arc lamp, a cylindrical filter 78 is provided around the sample tube 10 between the tube and the mercury vapor lamp. This filter may be formed by an annular glass chamber filled with a liquid having the desired filtering characteristics. Such filtering liquids are well known.

As best shown in Figure 5, one end of the tube 10 is closed by the spherical mirror 2. At the opposite end of the tube a lens system, generally indicated at 80, corresponds to the lens 4 of Figures 1, 2 and 3. The 90° truncated prism 6 is cemented directly to the outer end of this lens system, the truncated exit port of the prism being again indicated at 8.

The tube 10 is so dimensioned and positioned relative to the source of light 76 that none of the light entering the tube 10 will be deflected so as to pass through the truncated portion 8 of the prism 6 unless it is scattered by the molecules of the liquid within the sample tube 10.

With this arrangement, intense illumination of the liquid is provided which produces a substantial amount of scattered light. The optical system, as described above, is such that the light scattered into a suitable direction in the liquid will be reflected back and forth between the spherical mirror surface 3 and the sloping walls of the prism 6 until it finally emerges through the truncated portion 8 of the prism.

The light emerging from the prism 6 may be directed through one or more conventional focusing lenses, as indicated at 82 in Figure 4, and reflected by an angularly-positioned mirror 84, which may be arranged to direct the collected light onto a conventional spectrograph or monochromater and detector.

Because the major portion of the light generated in the tube 10 which eventually emerges through the truncated portion of the prism 6, will traverse the lens system 80 several times, the lens system must be as nearly transparent as possible and must be corrected for aberrations.

This lens system is provided with a spherical surface adjacent the sample, the center of curvature coinciding with the surface of the spherical mirror, so that light passing between the lens system and the center of the spherical mirror surface 3 is not refracted at the lens surface. Thus, these rays will not be affected by changes in the index of refraction of the sample, and other rays will be refracted by lesser amounts than if a plane or convex surface were employed. Other parts of the lens system 80 are arranged to compensate for the spherical surface so that the overall lens system has a focal length equal to the distance between the lens 80 and the spherical mirror 2.

The lens system may be constructed in any desired manner to give the necessary corrections for aberration and in this particular example the lens elements 88 and 96 are formed of Corning glass No. 620603 (refractive index—1.620, dispersion—60.3); lens elements 86 and 90 and 94 are formed of fused quartz, and lens element 92 is formed of Bausch and Lomb glass DF-2 (refractive index—1.617, dispersion—36.6).

The first element 86 of this lens system is provided with a spherical surface, the center of curvature of which is at the center of the spherical mirror surface 3. The opposite surface of lens element 86 is a plane surface that is cemented to an adjacent plane surface of the next lens element 88. The adjacent surfaces of the lens elements 88 and 90, in this particular example, have a radius of curvature of 19.36 mm., as do the adjacent surfaces of lens elements 90 and 92. The adjacent surfaces of lens elements 92 and 94 have a radius of curvature of 11.63 mm. and the adjacent surfaces of lens elements 94 and 96 have a radius of curvature of 13.73 mm. The adjacent curved lens surfaces are, respectively, concave and convex, as is illustrated clearly in the drawing, so that no air spaces remain between the lens elements. The end lens element 96 is provided with a plane surface to which is cemented the plane hypotenuse surface of the prism 6. This lens system has an effective focal length of 99.3 mm.

As previously mentioned, the center line of the prism 6 is off-set from the center line of the lens system 80 by a small amount to attain the desired multiple-reflection long optical path.

From the foregoing, it will be apparent that the optical system embodying the invention is well adapted to attain the ends and objects hereinbefore set forth and that it is subject to various modifications such as may be desirable in adapting the invention to the conditions of each particular use.

For example, Figure 6 indicates diagrammatically an arrangement in which a lens 98 and a 90° prism 100 are substituted for the spherical mirror surface 3, the prism 100 being rotated 90° relative to the prism 6. This lens 98 has a focal length equal to the spherical mirror 2 so that the light passes back and forth through the sample as described in connection with the examples set forth above.

Figure 7 shows another arrangement in which a lens 102 and a plane mirror 104 are substituted for the spherical mirror surface 3, the lens 102 being similar to the lens 4.

Figure 8 shows an arrangement wherein the prism 6 is truncated only at the side. The operation of this optical system is similar to the ones described previously except that light is not permitted to enter or leave the optical system through the prism. One continuous optical path is indicated by the successive lines 106, 108, 110, 112, 114, 116, 118 and 120. The lens 4 and the spherical mirror surface 3 may be substantially as described in the foregoing examples.

Thus, light may be admitted to the system or permitted to exit from the system through the lens 4 over an area which is at one side of the prism 6.

Moreover, it will be apparent that the simple lenses shown herein may represent diagrammatically multi-element lens systems arranged to provide any desired corrections or compensations.

I claim:

1. An optical system having a long optical path in a relatively limited space by multiple traversals of the optical path through the space with substantially no loss of aperture comprising a converging lens, means for reflecting and focusing radiation from said lens back into it, said reflecting and focusing means being spaced from and aligned on a common axis with said lens, and two reflecting surfaces inclined at a 90° angle to each other and positioned slightly offset from said common axis on the opposite side of said lens from said reflecting and focusing means and oriented to reflect light from said lens back into it.

2. An optical system having a long optical path within a relatively small space by repeated traversals of the optical path through the space with substantially no loss of aperture comprising a converging lens, a mirror with a concave reflecting surface arranged to focus radiation from said lens back into it, said mirror being spaced from and aligned on a common axis with said lens, and two reflecting surfaces inclined at a 90° angle to each other, positioned slightly offset from said common axis on the opposite side of said lens from said mirror with the concave reflecting surface and oriented to reflect light from said lens back into it.

3. An optical system having a long optical path within a relatively small space by multiple traversals of the optical path through the space with substantially no loss of aperture comprising a mirror having a concave reflecting surface, a converging lens system spaced from and having an optical axis in common with said mirror, and a 90° prism, the concave mirror surface facing the hypotenuse surface of said prism through said lens system, said prism being slightly offset from said common optical axis.

4. An optical system having a long optical path within a relatively small space by repeated traversals of the optical path through the space with substantially no loss of aperture comprising a mirror having a concave reflecting surface, a converging lens system spaced from and having an optical axis in common with said mirror, and a 90° prism, the concave mirror surface facing the hypotenuse surface of said prism through said lens system, said prism having a polished surface opposite said hypotenuse surface and connecting the 90° surfaces thereof, said prism being slightly offset from said common optical axis.

5. An optical system having a long optical path within a relatively restricted space by repeated traversals of the optical path through the space and wherein substantially no loss of aperture occurs comprising a first reflecting element having reflecting surfaces lying respectively in first and second planes forming a 90° angle, a second reflecting element having reflecting surfaces lying respectively in third and fourth planes forming a 90° angle, and a pair of lenses spaced from each other and positioned between said first and second reflecting elements, the line of intersection of said first and second planes being perpendicular to the line of intersection of said third and fourth planes.

6. An optical system producing a long optical path within a relatively limited space by repeated traversals of the optical path through the space and wherein substantially no loss of aperture occurs comprising a first prism having reflecting surfaces lying respectively in first and second planes forming a 90° angle, a second prism having reflecting surfaces lying respectively in third and fourth planes forming a 90° angle, and a pair of lenses spaced from each other and positioned between said first and second prisms, the line of intersection of said first and second planes being perpendicular to the line of intersection of said third and fourth planes, said second prism being truncated near the intersection of said third and fourth planes to form a polished surface connecting said reflecting surfaces opposite the hypotenuse face of the prism.

7. A multiple-reflection long path optical system wherein the long path is obtained by repeated traversals of the optical path through a relatively limited space and wherein substantially no loss of aperture occurs comprising first and second 90° prisms, means supporting said prisms in spaced relationship with their hypotenuse faces directed toward each other, the 90° surfaces of one of said prisms being rotated 90° relative to the corresponding surfaces of the other prism, a pair of lenses, means supporting said lenses in spaced relationship between said prisms, one of said prisms and said lenses having a common optical axis, the other of said prisms being displaced from said axis and being truncated to provide a polished surface separate from the 90° and hypotenuse surfaces so that light can be admitted to or radiated from said optical system.

8. An optical system producing a long optical path within a relatively restricted space by repeated traversals of the optical path through said space with substantially no loss of aperture having a long optical path within a small space comprising a concave mirror, a converging lens system spaced from and positioned along the axis of said mirror, and a prism having a front face adjacent said converging lens on the opposite side from said mirror and having reflecting surfaces lying in planes separated by 90° and arranged to receive light from said lens system and displace it and reflect it back into said lens system, the intersection of the planes of said reflecting surfaces of said prism being slightly off-set from the common axis of said mirror and lens, the focal length of said lens system being substantially equal to the distance between said lens and said mirror.

9. An optical system producing a long optical path within a relatively restricted space by repeated traversals of the optical path through said space with substantially no loss of aperture comprising a concave mirror, a converging lens system spaced from said concave mirror, and a prism having a front face adjacent said converging lens on the opposite side from said mirror and having reflecting surfaces lying in planes separated by 90° and arranged to receive light from and reflect it back into said lens system, the intersection of the planes of said reflecting surfaces of said prism being slightly off-set from the optical axis of said mirror, said lens system having a spherical surface facing said mirror, said spherical surface and said concave mirror having radii of curvature substantially equal to the distance between said mirror and said lens system and to the distance between said mirror and the intersection of said reflecting surfaces, respectively.

10. An optical system producing a long optical path within a relatively restricted space by repeated traversals of the optical path through said space with substantially no loss of aperture comprising a concave mirror, a converging lens system spaced from said mirror and having a common optical axis therewith, and a prism having its hypotenuse face secured to said lens on the opposite side thereof from said mirror and having reflecting surfaces lying in planes separated by 90° and arranged to receive light from and reflect it back into said lens system, said prism having a polished surface opposite from and substantially parallel with its hypotenuse surface and joining said reflecting surfaces, the intersection of the planes of said reflecting surfaces of said prism being slightly off-set from said common axis of said mirror and said lens, said lens system having a spherical surface facing said mirror, said spherical surface and said concave mirror having radii of curvature substantially equal to the distance between said mirror and said lens system.

11. An optical system having a long optical path in a relatively limited space by multiple traversals of the optical path through the space with substantially no loss of aperture as claimed in claim 1 and wherein said reflecting and focusing means includes a mirror having a plane reflecting surface and a second converging lens system between said mirror surface and said first converging lens.

12. An optical system having a long optical path in a relatively limited space by multiple traversals of the optical path through the space with substantially no loss of aperture as claimed in claim 1 and including a 90° prism, said two reflecting surfaces being the two surfaces of said 90° prism adjacent to the right angle, the hypotenuse face of said prism facing said converging lens, said two reflecting surfaces lying in planes intersecting the common axis at spaced points.

13. An optical system having a long optical path in a relatively limited space by multiple traversals of the optical path through the space with substantially no loss of aperture as claimed in claim 2 and wherein said converging lens has a focal length equal to the distance from the lens to the concave mirror surface.

14. An optical system having a long optical path in a relatively limited space by multiple traversals of the optical path through the space with substantially no loss of aperture as claimed in claim 1 and wherein said converging lens comprises a system of elements, the surface of the first element nearest said reflecting and focusing means being a spherical surface the center of curvature of which is near the effective optical position of said reflecting and focusing means.

15. An optical system having a long optical path in a relatively limited space by multiple traversals of the optical path through the space with substantially no loss of aperture as claimed in claim 14 and wherein said reflecting and focusing means is a mirror having a concave reflecting surface and the center of curvature of the spherical surface of said first element is near the center of the concave mirror surface.

16. An optical system having a long optical path within a relatively small space by repeated traversals of the optical path through the space with substantially no loss of aperture as claimed in claim 4 and wherein said polished surface is substantially parallel with the hypotenuse surface to permit the escape of light from said optical system.

17. An optical system as claimed in claim 12 having a long optical path in a relatively limited space by multiple traversals of the optical path through the space with substantially no loss of aperture and wherein said prism has light entrance and exit portions formed by a first polished surface opposite said hypotenuse surface and joining the 90° surfaces of said prism and a second polished surface joining one of said 90° surfaces and said hypotenuse surface and being substantially perpendicular to the plane of said first polished surface.

References Cited in the file of this patent

UNITED STATES PATENTS

| | | |
|---|---|---|
| 883,868 | Ford | Apr. 7, 1908 |
| 1,252,512 | Twyman et al. | Jan. 8, 1918 |
| 1,783,998 | Chretien | Dec. 9, 1930 |
| 1,813,673 | Mihalyi | July 7, 1931 |
| 1,848,874 | Fitz Gerald | Mar. 8, 1932 |
| 1,999,867 | Cawley | Apr. 30, 1935 |
| 2,356,274 | Roger | Aug. 22, 1944 |
| 2,402,856 | Turrettini | June 25, 1946 |
| 2,562,181 | Frommer | July 31, 1951 |

FOREIGN PATENTS

| | | |
|---|---|---|
| 668,449 | Germany | Dec. 3, 1938 |

OTHER REFERENCES

J. O. S. A., vol. 32, 1942, Katz et al., pages 457–464.